(12) United States Patent
Pednekar et al.

(10) Patent No.: US 6,385,023 B1
(45) Date of Patent: May 7, 2002

(54) RECLOSING APPARATUS FOR AUXILIARY SYSTEMS

(75) Inventors: Sudhir Pednekar, Baden-Rütihof (CH); Hans-Werner Schlett, Waldshut (DE); Richard Blatter, Ennetbaden; Theo Goebelbecker, Fislisbach, both of (CH)

(73) Assignee: Asea Brown Boveri AG, Baden (CH)

( * ) Notice: Subject to any disclaimer, the term of this patent is extended or adjusted under 35 U.S.C. 154(b) by 0 days.

(21) Appl. No.: 09/438,585

(22) Filed: Nov. 12, 1999

(30) Foreign Application Priority Data

Nov. 19, 1998 (DE) ......................... 198 53 183

(51) Int. Cl.⁷ .............................. H02H 3/00
(52) U.S. Cl. ......................... 361/71; 361/78
(58) Field of Search .................. 361/59–75; 307/11, 307/17–19, 29, 38–42, 112–116, 125, 126, 139, 141.4; 700/286, 295

(56) References Cited

U.S. PATENT DOCUMENTS

| | | | | |
|---|---|---|---|---|
| 4,156,280 A | * | 5/1979 | Griess | 364/481 |
| 4,689,708 A | * | 8/1987 | Hager et al. | 361/65 |
| 4,772,977 A | * | 9/1988 | Bottrell et al. | 361/23 |
| 4,862,287 A | * | 8/1989 | Paul | 361/88 |
| 5,303,112 A | * | 4/1994 | Zulaski et al. | 361/67 |

FOREIGN PATENT DOCUMENTS

| | | |
|---|---|---|
| DE | 398 501 | 12/1994 |
| EP | 0 599 438 | 6/1994 |

OTHER PUBLICATIONS

"BBC Reclosing Device", XT 374a–E, D KWL 6309 94 E/04/95, pp. 191–197.

Borst, Alexander, "Sicherheit der Eigenbedarfs–und Notstromversorgung in Kraftwerken", ETZ–A, Bd. 96 (1975), H.2, pp. 76–83.

* cited by examiner

*Primary Examiner*—Josie Ballato
*Assistant Examiner*—Kim Huynh
(74) *Attorney, Agent, or Firm*—Burns, Doane, Swecker & Mathis, L.L.P.

(57) ABSTRACT

A reclosing apparatus for the auxiliary systems of a plant, in particular a power station, has drive modules (81) for actuating electrical drives (23a, 23b, 33, 53a, 53b, 63, 73) of the auxiliary systems. Each drive module (81) of a reclosable drive (23a, 33, 53a, 63, 73) is assigned a reclosing module (82). When a voltage interruption occurs, the reclosing modules (82) switch the drives (23a, 33, 53a, 63, 73) by opening switches (22a, 32a, 52a, 62, 72). If the end of the voltage interruption is detected within a predetermined time, the reclosing modules (82) switch the drives (23a, 33, 53a, 63, 73) on again. Each busbar (2, 3, 5, 6, 7) which supplies a drive (23a, 33, 53a, 63, 73) provided with a reclosing module (82) is equipped with a microprocessor-controlled voltage monitoring device (21).

8 Claims, 3 Drawing Sheets

RECLOSING APPARATUS FOR AUXILIARY SYSTEMS

TECHNICAL FIELD

The invention relates to the field of electrical and control systems, in particular power station control systems.

PRIOR ART

Such a reclosing apparatus is known, for example, from the product documentation "BBC Reclosing Device", D KWL 6309 94 E 04/95.

FIG. 1a shows an example of an arrangement in which a reclosing apparatus according to the prior art is used. The figure shows an electrical network for supplying auxiliary systems in a power station plant, for example a gas turbine or combined power station. Such auxiliary systems are preferably used for supplying cooling water, fuel, lubricating oil, hydraulic oil or cooling air. A high-voltage busbar which is connected to a high-voltage network uses an auxiliaries transformer 11 to supply a plurality of busbars 2, 3, 4, 5, 6, 7, and uses medium-voltage transformers 24 to supply a plurality of medium-voltage and low-voltage drives (23a, 23b, 33, 53a, 53b, 63, 73 for the auxiliary systems. A single voltage monitoring device 21 is connected to the high-voltage busbar.

FIG. 1b shows components that are relevant in this context relating to control systems associated with FIG. 1a. Each drive is assigned a drive module 81. A plurality of drive modules are connected to a reclosing device 84. The reclosing device comprises a plurality of reclosing modules 82, each of which is connected to a plurality of drive modules, as well as a coupling module 83. The coupling module is connected to the one voltage monitoring device, and to each of the reclosing modules.

Such reclosing apparatuses are intended to prevent the power station from being disconnected if a brief voltage interruption (of up to 2 seconds) that is to say a significant drop in the operating voltage, occurs on the high-voltage network, or when a busbar is being switched over to a different supply. Such a transient fault causes, for example, a sudden voltage drop on the high-voltage busbar. This voltage drop is transformed to the medium-voltage and low-voltage levels, and can lead to disconnection of the auxiliary systems.

In order to prevent the entire plant from being shut down, reclosing apparatus according to the prior art have the voltage monitoring device mentioned above. This monitors the voltage on a single busbar, for example at the medium-voltage level. As soon as the voltage monitoring device detects a drop in the voltage below a lower threshold value UU (FIG. 3), the reclosing modules are activated via the coupling module. These reclosing modules switch off the drives associated with them. If the monitored voltage exceeds an upper threshold value UO within a predetermined time window TW, the reclosing modules switch the drives associated with them on again.

If the monitored voltage does not exceed the upper threshold value UO within the predetermined time window TW, the switched-off drives are definitively no longer switched on. Instead of this, an alarm is output and, in some circumstances, the entire power station is shut down.

The drives are generally reconnected staggered in time, in order to prevent the starting currents from overloading the auxiliaries transformer: in the plant design, the drives for auxiliary systems are preferably characterized on the basis of their fault time. The fault time is the maximum time period during which a drive for a specific auxiliary system may remain switched off without it being necessary to shut down the entire power station plant, or a major part of the plant. With regard to the rest of the design of the plant, the drives having the shortest fault time are combined to form a first reclosing group, also called sequence, and are assigned to a reclosing module. In the same way, the other drives are grouped on the basis of their fault times to form further reclosing groups, and each reclosing group is assigned to a further reclosing module. In this case, the reclosing modules have different reclosing times. These reclosing times are determined and matched to one another during the design of the plant, for example on the basis of simulations of various disturbance situations.

The coupling module coordinates the sequence of reclosing the reclosing groups as a function of the voltage monitoring device and reports from the individual reclosing modules.

The unavoidable inaccuracies in the simulation of disturbance situations mentioned above lead to an excessively conservative protection response and thus to the entire plant being shut down unnecessarily. Owing to the complexity of the coupling module, it is very difficult to reconfigure the reclosing device on the basis of measured disturbance situations.

DESCRIPTION OF THE INVENTION

The object of the invention is therefore to provide a reclosing apparatus of the type mentioned initially, which overcomes the disadvantages mentioned above.

In the reclosing apparatus according to the invention, a dedicated reclosing module is assigned to a drive module for each drive for which reclosing is desired.

In consequence, it is possible to set the reclosing time individually for each drive. There is no coupling module between different reclosing modules, leading to considerable simplification of the design complexity and eliminating fault sources.

The reclosing module is designed as a functional module which is separate from a drive module, so that drives in which there is no need for reconnection can be operated with the same drive modules.

In one preferred embodiment of the subject matter of the invention, drive groups are defined in order to limit overloading of the auxiliaries transformers as well as voltage transients during reclosing. A drive group is defined by setting the reclosing modules assigned to the drives in a group of the drives to have the same reclosing time. A drive is thus assigned to a drive group purely by the setting of the reclosing time. Typically, various disturbance situations are simulated for this purpose during the design of the plant, analysing how the voltages rise again on the various busbars, and thus optimizing the reclosing times.

The actual response of the plant in a disturbance situation is observed during commissioning. Adaptations of the parameters for the reclosing modules, in particular the reclosing time, are adapted and optimized in the process. In this way, even the association with a drive group can be changed without further effort.

A major advantage of the reclosing apparatus of the type described above is that there is no longer any need for a coupling module. This eliminates a significant design effort and a major fault source.

In one preferred embodiment of the subject matter of the invention, each busbar which supplies a drive provided with a reclosing module is assigned a dedicated voltage monitoring device.

The voltage monitoring device advantageously contains a microprocessor. This is used, for example, to measure and evaluate the voltage.

Furthermore, the voltage monitoring device preferably contains at least one converter for cyclic sampling and evaluation of the voltage. The converter sampling time is preferably shorter than 100 ms. In consequence, the fact that an upper voltage threshold value has been exceeded is also detected correspondingly quickly and accurately.

As a result of the above fact, and since each relevant busbar has a dedicated voltage monitoring device, it is possible to react more quickly than in the past to the rise in the busbar voltage. This also avoids the influence of the inaccuracies of the simulations used during design. For example, consideration is also given to the influence of the motors which, depending on their load, act as generators when the supply fails. This provides increased protection against a shutdown of the plant.

A further major advantage is that the reclosing apparatus can reclose individual non-critical drives in a disturbance situation even though the predetermined time window has already been exceeded for other, critical drives. In this case, although disconnection of the critical drives initiates a shutdown of the entire plant, the time and complexity for restarting the plant are reduced since the non-critical drives continue to run.

BRIEF DESCRIPTION OF THE DRAWINGS

The subject matter of the invention will be explained in more detail in the following text with reference to a preferred exemplary embodiment which is illustrated in the attached drawings, in which.

In principle, identical parts are provided with the same reference symbols in the figures. The circuits denoted by A, B, C, D, E, F and V1 to V5 denote connections between the elements from FIGS. 1a and 1b as well as 2a and 2b.

WAYS TO IMPLEMENT THE INVENTION

Figure 1A:
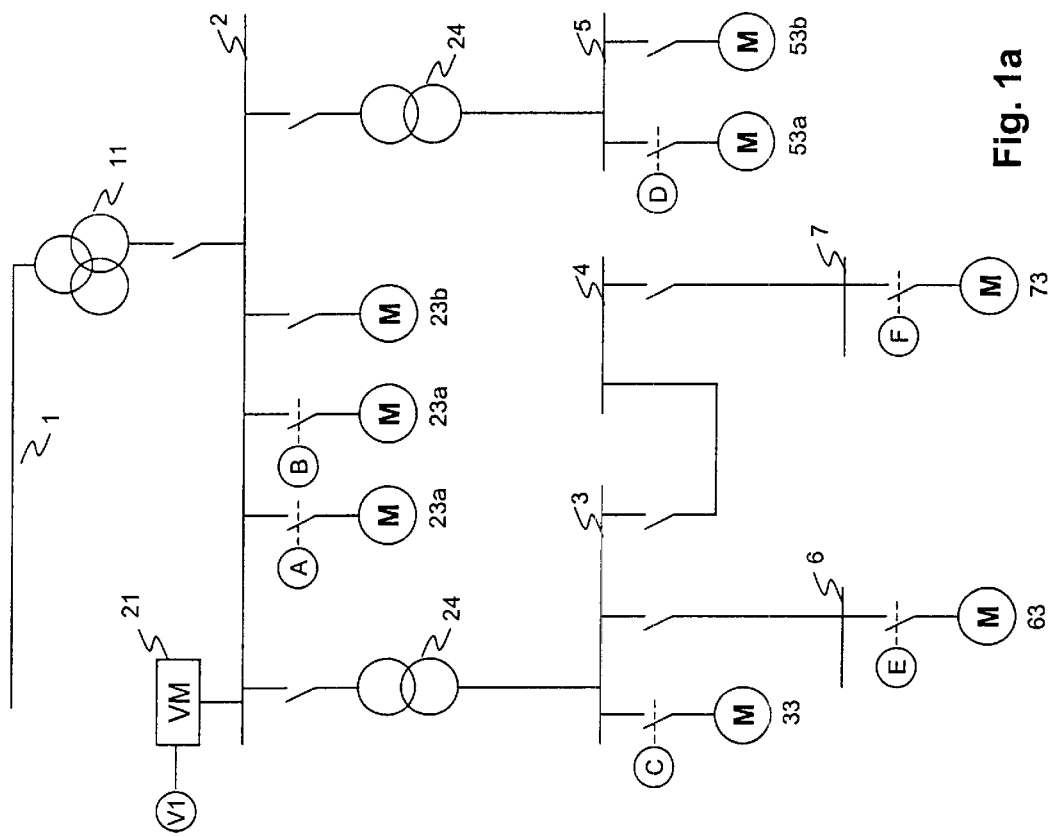
FIG. 1a shows a part of a plant having electrically driven auxiliary systems according to the prior art.
Figure 1B:
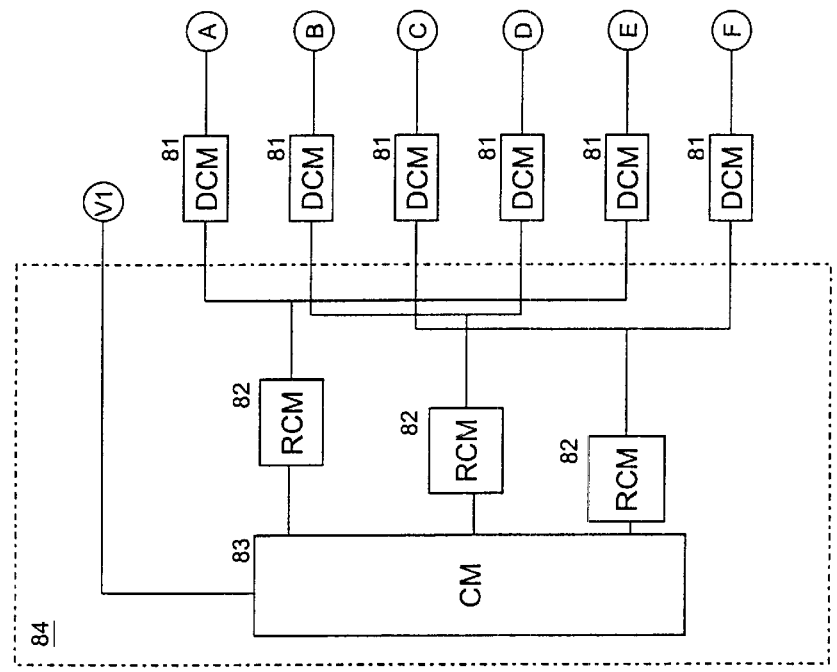
FIG. 1b shows those functional blocks which are associated with FIG. 1a and are essential for reclosing, and signals of the reclosing apparatus according to the prior art.
Figure 2A:
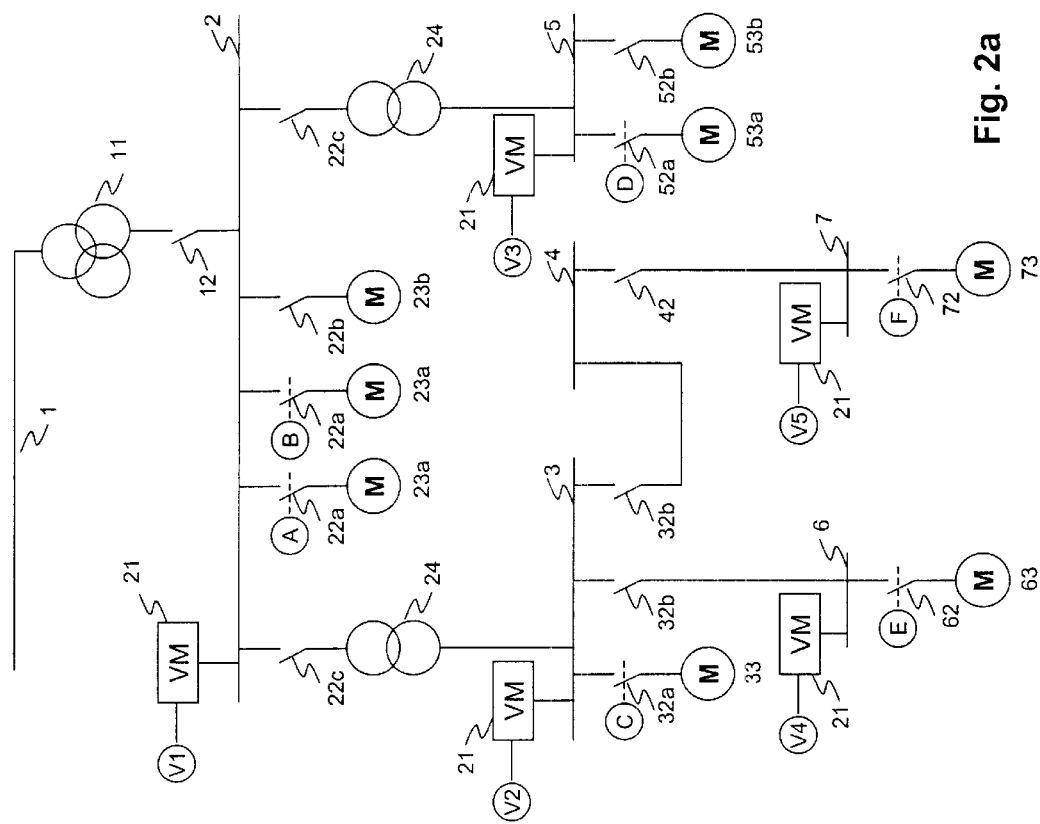
FIG. 2a shows a part of the plant having electrically driven auxiliary systems according to the invention.
Figure 2B:
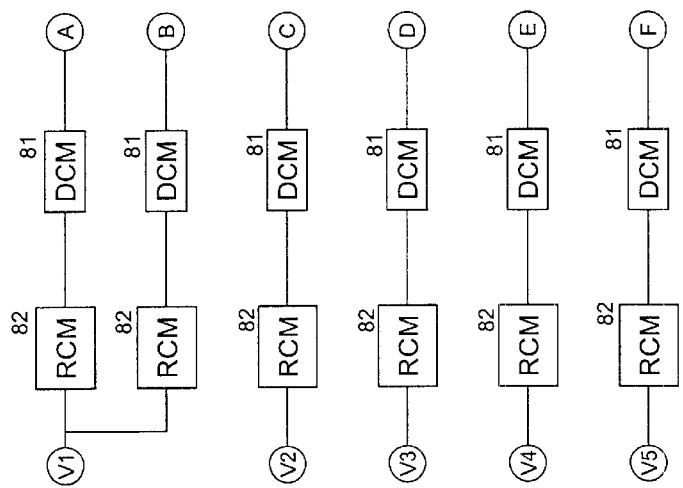
FIG. 2b shows those functional blocks which are associated with FIG. 2a and are essential for reclosing, and signals of the reclosing apparatus according to the invention.

FIGS. 2a and 2b show that part of a plant, in particular a power station, which is essential to the invention, with auxiliary systems. A three-phase high-voltage busbar 1 supplies a medium-voltage busbar 2 via an auxiliaries transformer 11 and a switch 12. The medium-voltage busbar is connected to a voltage monitoring device 21, a plurality of medium-voltage drives 23a, 23b with associated switches 22a, 22b, as well as transformers 24 with associated switches 22c. The transformers 24 supply low-voltage busbar 3 and 5, and thus low-voltage drives 33, 53a, 53b with switches 32a, 52a, 52b. The low-voltage busbar 3 is connected via a switch 32b to low-voltage busbars 6 and 4. The low-voltage busbar 6 supplies a low-voltage drive 63 via a switch 62. The low-voltage busbar 4 supplies a low-voltage busbar 7 via a switch 42, and a low-voltage drive 73 via a switch 72.

The drives 23a, 23b, 33, 53a, 53b, 63, 73 drive auxiliary systems such as water treatment, fuel supply, lubricating-oil supply, hydraulic-oil pumps, cooling air.

The drives 23b and 53b are not reclosable, while the others are reclosable. Each drive is assigned a drive module in the control system, FIG. 2b shows those drive modules 81 which are assigned to the reclosable drives 23a, 33, 53a, 63, 73. A drive module 81 comprises the control and protection logic for a single drive, and locally, for example, monitors the motor voltages, currents and temperatures, and actuates the switch 22a, 32a, 52a, 63, 72.

Each drive module 81 is assigned a dedicated reclosing module 82. The connection between a drive module 81 and its reclosing module 82 is used, inter alia, to transmit switching commands from the reclosing module 82 to the drive module 81 and, inter alia, to transmit reports and status information from the drive module 81 to the reclosing module 82.

Each busbar 2, 3, 5, 6, 7 which supplies a reclosable drive 23a, 33, 53a, 63, 73 is preferably provided with a dedicated voltage monitoring device 21.

Figure 3:
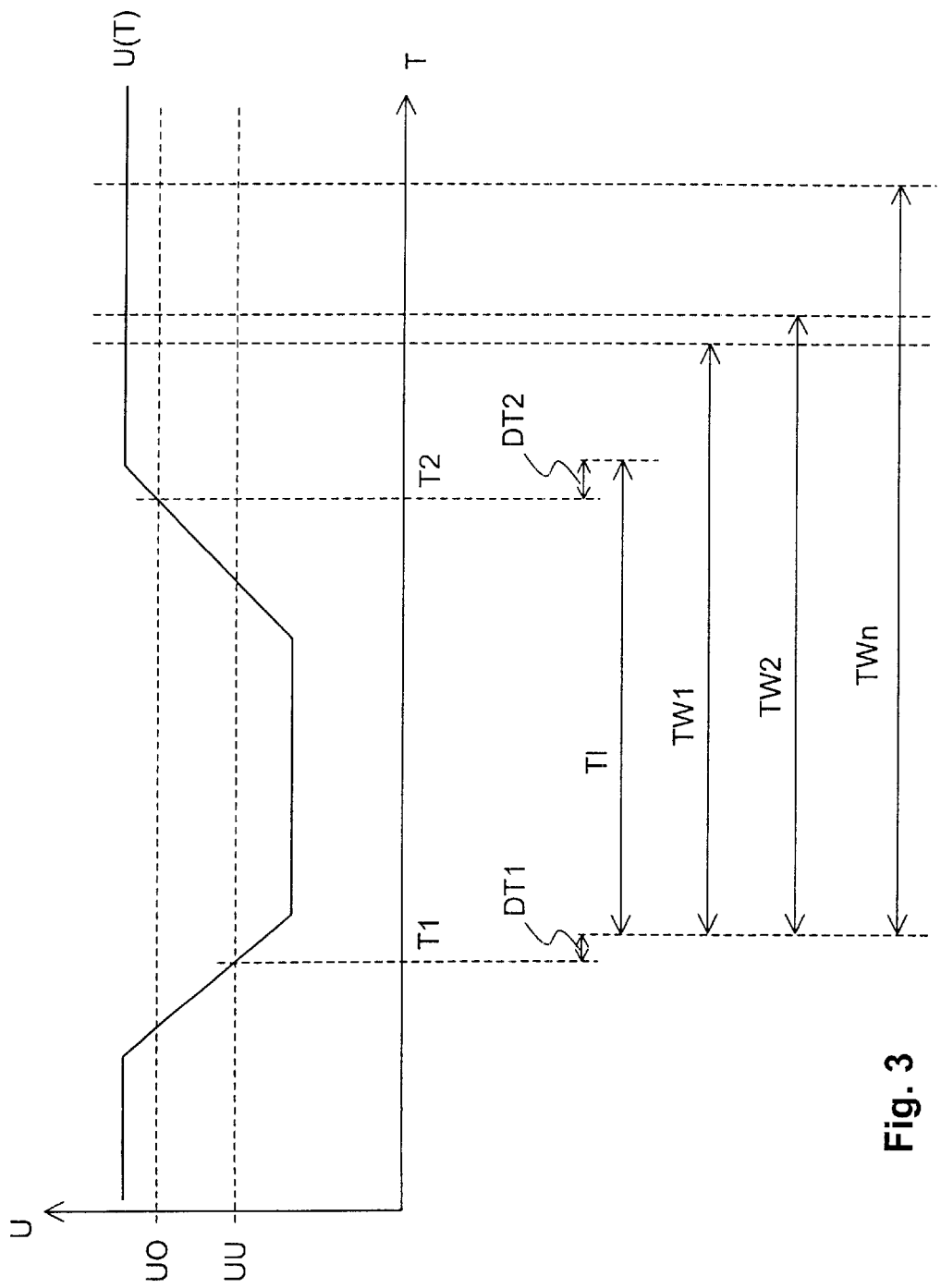
FIG. 3 shows the waveform of the voltage on a busbar.

The reclosing apparatus operates as follows (FIG. 3): the voltage U(T) on the busbar is calculated, for example, from the filtered sum of the squares of the instantaneous values of the phase voltages. As soon as one of the voltage monitoring devices 21 detects a drop in the voltage below a threshold value UU, after a delay time DT1 which is governed by instrumentation, the one or more reclosing modules 82 connected to it are activated. The reclosing module 82 switches off the drives associated with it. This individual switching-off process is a major advantage of the invention. If the monitored voltage U(T) exceeds the threshold value UO within a predetermined time window TW1 to TWn, this is detected by the voltage monitoring device after a delay time DT2, and is reported to the reclosing module, which then switches the drives associated with it on again.

UU is typically about 70%, and UO about 90%, of the rated voltage. The predetermined time window may assume different values TW1 to TWn for different drives, and thus for their reclosing modules as well, depending on the drive fault time.

If the monitor voltage U(T) does not exceed the threshold value UO within the predetermined time window TW, the drives which have been switched off are definitively no longer switched on. Instead of this, an alarm is output and, in some circumstances, the entire power station is disconnected.

The drives are generally reclosed staggered in time, in order to prevent the starting currents from overloading the auxiliaries transformers: in the design of the plant, the drives for auxiliary systems having the shortest fault time are combined to form a first drive group. The associated reclosing modules have the same reclosing time. The other drives are likewise grouped to form further drive groups, and their reclosing time is set, on the basis of their fault times. The reclosing times are matched to one another during the design of the plant, for example on the basis of simulations of various disturbance situations. When the plant is being commissioned, real disturbance situations are produced, and the reclosing times are optimized on the basis of measurements. The association of a drive with a drive group, or the creation of a new drive group, is carried out easily, just by setting the reclosing times.

What is claimed is:

1. Reclosing apparatus for a plant comprising:
   a plurality of jointly supplied electrical drives, having at least one voltage monitoring device, at least two reclosing modules which are electrically connected to the at least one voltage monitoring device in order to transmit voltage values, and for which the reclosing time of each module is individually adjustable, and at least two drive modules, where each drive module comprises control and protection logic for a single electrical drive and is configured to actuate the electrical drive, which drive modules are electrically connected to the reclosing modules wherein each reclosing module is configured to transmit switching commands to a drive module in order to switch an electrical drive off and on, depending on a transmitted voltage value, and each reclosing module is assigned one, and only one, drive module.

2. Reclosing apparatus according to claim 1, characterized in that at least two voltage monitoring devices are provided, and in that each reclosing module is assigned one, and only one, voltage monitoring device.

3. Reclosing apparatus according to claim 1, characterized in that the at least one voltage monitoring device contains at least one microprocessor for measurement and evaluation of the voltage.

4. Reclosing apparatus according to claim 3, characterized in that the at least one voltage monitoring device has a converter for cyclic sampling and evaluation of the voltage.

5. Reclosing apparatus according to claim 4, characterized in that the converter has a sampling time of less than 100 ms.

6. Reclosing apparatus according to claim 1, characterized in that the at least one voltage monitoring device has a display for the measured voltage, and/or is connected to a device for displaying the measured voltage.

7. Reclosing apparatus according to claim 1, characterized in that the at least one voltage monitoring device has a recording unit for storing the measured voltage, and/or is connected to a device for storing the measured voltage.

8. Plant having a plurality of jointly supplied electrical drives and having a reclosing apparatus according to claim 1, characterized in that the drives are connected to one another by busbars which supplies at least one drive which is operatively connected to a reclosing module is assigned to dedicated voltage monitoring device in order to transmit voltage information relating to this busbar to the at least one associated reclosing module.

* * * * *